United States Patent [19]
Park

[11] Patent Number: 5,874,791
[45] Date of Patent: Feb. 23, 1999

[54] HOUSING FOR SPINDLE MOTOR AND FABRICATING METHOD THEREOF

[75] Inventor: Il Oung Park, Seoul, Rep. of Korea

[73] Assignee: Samsung Electro-Mechanics Co. Ltd., Suwon, Rep. of Korea

[21] Appl. No.: 929,850

[22] Filed: Sep. 15, 1997

[30] Foreign Application Priority Data

Sep. 20, 1996 [KR] Rep. of Korea ............... 1996-30221 U

[51] Int. Cl.$^6$ .................................................. H02K 15/14
[52] U.S. Cl. ................................................ 310/42; 310/89
[58] Field of Search ........................... 310/89, 42; 29/596

[56] References Cited

U.S. PATENT DOCUMENTS 5,649,442 7/1997 Yoshikawa et al. ...................... 72/254

*Primary Examiner*—Nestor Ramirez
*Assistant Examiner*—Judson H. Jones
*Attorney, Agent, or Firm*—Ladas & Parry

[57] ABSTRACT

A housing for spindle motor with low height has an improved structure to facilitate the chucking by previously forming a chucking groove first formed into a corner part along the inside of a chucking portion, and its fabricating process is improved to simultaneously fabricate important parts since the chucking is facilitated as such. Here, a shallow annular groove with an optional width is previously formed along the innermost side of the bottom plane of a flange part to fabricated the bottom plane of the flange part at a time during a precise fabricating process of cutting the parts requiring precision tolerance free from a chuck of a cutter tool that grips an outer circumference of a disc part. Its fabricating is performed by chucking a cylinder part to expose the bottom plane of the flange part, i.e., the disc part, cutting the disc part to exactly maintain the verticality with the bottom plane of the flange part by simultaneously fabricating the outer circumference of the disc part to have the same dimension down to the bottom of the annular groove, releasing the chucking of the cylinder part to chuck the opposite outer circumference side of the disc part so as to make the edge end of the chuck be deeply engaged down to the bottom of the annular groove, and sequentially cutting inner and outer diameters of the cylinder part, upper plane of the flange part and a shaft hole.

3 Claims, 4 Drawing Sheets reference plane

HOUSING FOR SPINDLE MOTOR AND FABRICATING METHOD THEREOF

BACKGROUND OF THE INVENTION

1. Field of the Invention

The present invention relates to a thin and slim type spindle motor housing, and more particularly to a housing with a structural improvement and a fabricating method for easily fabricating the same by means of the improved structure.

2. Description of the Prior Art

Generally, a hard disc drive employed for a portable personal computer such as a notebook computer becomes more favorable as it gets thinner. Therefore, a motor for hard disc drive is also to be of a thin slim type spindle motor, and a motor housing for forming the thin and slim type spindle motor should be so low as shown in FIG. 1.

In view of the construction of housing 1, a disc part 12 has an outer circumference 12a of an optional thickness, a shaft hole 13 perpendicularly perforates through the center of disc part 12 for assembling a motor shaft 4, and a cylinder part 14 protrudingly installed upward around the periphery of shaft hole 13 for the purpose of assembling of a stator 5 and inserting a bearing 6. An upper jaw 14a is formed to the lower end of the outer periphery of cylinder part 14 to sustain stator 5.

A flange part 11 extends from outer circumference 12a of disc part 12 to be thinner than disc part 12 in a manner to extend at the upper thickness portion of outer periphery 12a for making the bottom plane of flange part 11 place on the upper plane of a PCB substrate 7.

The most important part in assembling as described above is, as shown in FIG. 2, the bottom plane of flange part 11, which becomes a reference plane. Besides, shaft hole 13 for tightly fitting with motor shaft 4 therethrough, upper jaw 14a for sustaining stator 5, outer circumference 12a of disc part 12 and so on should be precisely fabricated.

Also, in considering the fabricating process of the foregoing housing, a pre-processing is performed via a molding method such as a die casting for forming overall configuration at a time and then a cutting processing is performed upon portions that require precision tolerance via a lathe, etc.

The most serious problem in fabricating the housing is to perform a chucking operation more than three times when the parts requiring the precision tolerance are subjected to the cutting process by means of the lathe.

For example, referring to FIG. 3A, after performing the first chucking for temporarily chucking the outer circumference side of unprocessed disc part 12, the upper plane of flange part 11, cylinder part 14 and upper jaw 14a of cylinder part 14 are subjected to a rough-cutting process.

Successively, cylinder part 14 of opposite side is secondarily chucked as shown in FIG. 3B. Then, the bottom plane of flange part 11 and outer circumference 12a, which should be precisely fabricated because of being the reference plane, are fabricated.

After outer circumference 12a of disc part 12 is subjected to the normal chucking again as shown in FIG. 3C, the upper plane of flange part 11, cylinder part 14 and upper jaw 14a of cylinder part 14 are precisely fabricated.

The reason of performing the chucking thrice is in that cylinder part 14 is to be necessarily chucked while the outer circumference 12a of disc part 12 is processed, but neither cylinder part 14 even nor outer circumference 12a of disc part 12 is precisely processed yet. For this reason, the precise fabricating in the sequence of the first chucking of chucking disc part 12, the second chucking of chucking cylinder part 14 and the third chucking of chucking disc part 12 should be performed.

The conventional housing structure described as above involves the drawback in that, because of being difficult to separately provide the portion which is to be chucked at the bottom plane side of flange part 11 of housing 1, the bottom plane of flange part 11 being the reference plane and shaft hole 13 cannot be simultaneously processed, thereby processing the opposite side in advance and then reversely turning it to chuck for performing the processing again. Due to this fact, the verticality of the reference plane of flange part 11 with cylinder part 14 and that of the reference plane of flange part 11 with shaft hole 13 cannot be assured.

In some cases, despite that outer circumference 12a is low, if the chucking is forcibly executed prior to simultaneously processing the reference plane, shaft hole 13, stator cylinder part 14, a corner part 12b as shown in FIG. 2 cannot be thoroughly fabricated to result in a problem of additionally processing corner part 12b later.

SUMMARY OF THE INVENTION

Therefore, the present invention is devised to solve the foregoing problems. It is an object of the present invention to provide a housing for spindle motor with low height, of which structure is improved to facilitate the chucking by previously forming a chucking groove first formed into a corner part along the inside of a chucking portion. Further to this, its fabricating process is improved to simultaneously fabricate the important parts since the chucking is facilitated as such.

To achieve the above and other objects of the present invention, there is provided a housing for spindle motor including a disc part having an outer circumference of an optional thickness, a shaft hole perpendicularly formed in the center of the disc part, a cylinder part protrudingly installed upward around the periphery of the shaft hole, an upper jaw formed to the lower end of the outer periphery of the cylinder part, and a circular flange part extending from the upper portion of the outer circumference of the disc part to be thinner than the disc part. Here, a shallow annular groove is formed in advance along the innermost side of the bottom plane of the flange part to have an optional width, so that the bottom plane of the flange part is precisely fabricated at a time during a precision fabricating process of cutting the parts requiring precision tolerance free from a chuck of a cutter tool that chucks the outer circumference of the disc part.

In fabricating, the housing for spindle motor is molded to have a disc part with an outer circumference of an optional thickness, a shaft hole perpendicularly formed in the center of the disc part, a cylinder part protrudingly installed upward around the periphery of the shaft hole, an upper jaw formed to the lower end of the outer periphery of the cylinder part, a circular flange part extending from the upper portion of the outer circumference of the disc part to be thinner than the disc part, and a shallow annular groove formed along the innermost side of the bottom plane of the flange part. This process is performed in the sequence of chucking the cylinder part to expose the bottom plane of the flange part, i.e., disc part, cutting the disc part to exactly maintain the verticality with the bottom plane of the flange part. Especially, the outer circumference of the disc part is simultaneously fabricated to have the same dimensions as the bottom of the chucking groove. Then, the chucking of the cylinder part is released to chuck the opposite outer circumference side of the disc part in a manner to allow the edge end of the chuck to be deeply engaged down to the bottom of the chucking groove, and inner and outer diameters of the cylinder part, upper plane of the flange part and a shaft hole are sequentially cut.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1:
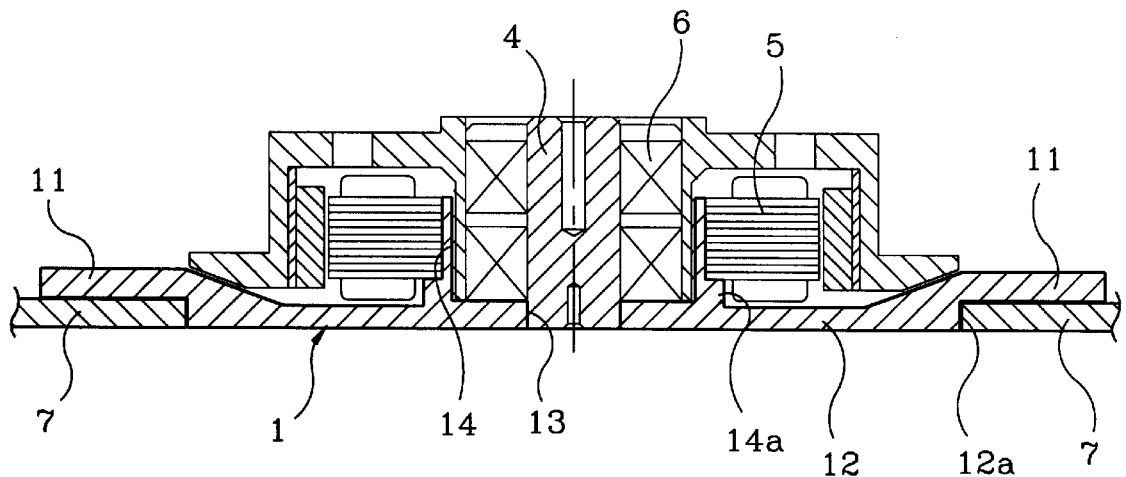
FIG. 1 is a view showing an example of a conventional housing for spindle motor.
Figure 2:
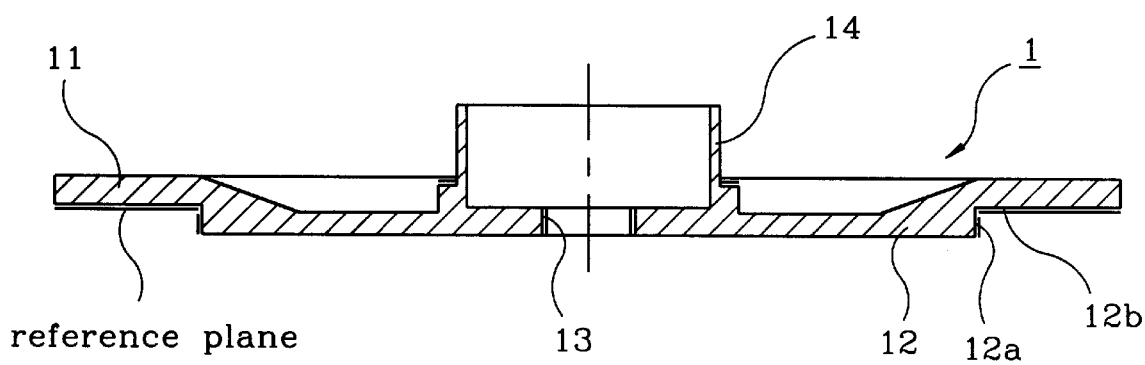
FIG. 2 is a sectional view of the housing shown in FIG. 1.
Figure 3:
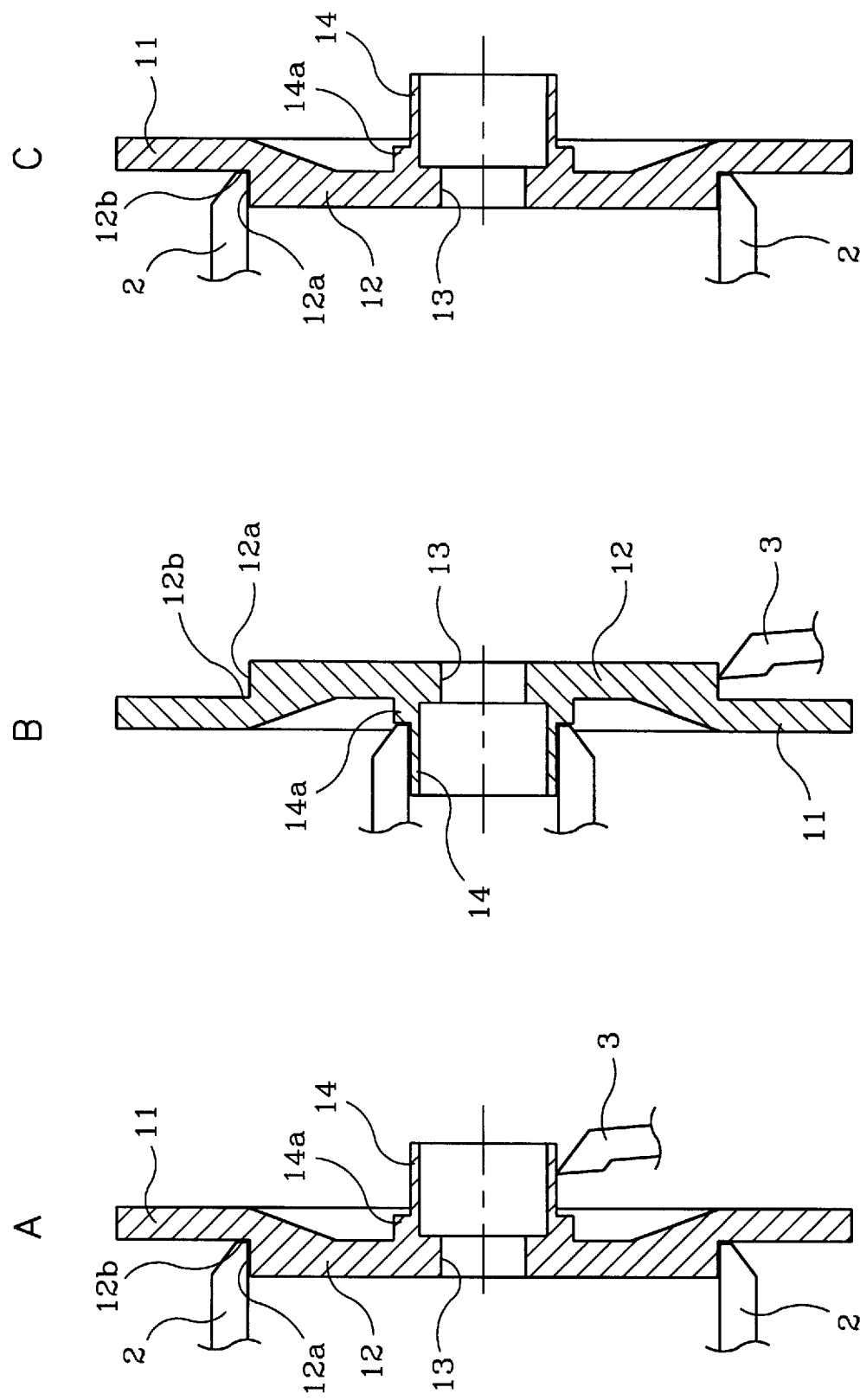
FIGS. 3A, 3B and 3C are views for illustrating the sequence of a conventional fabricating process.
Figure 4:
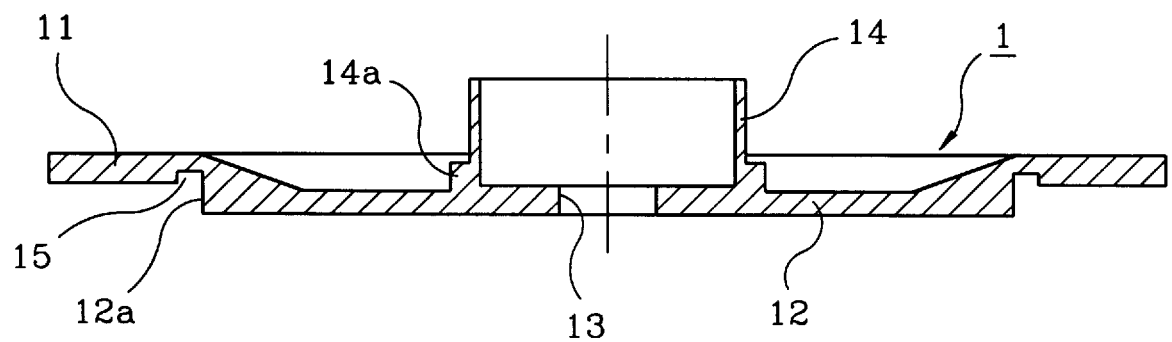
FIG. 4 is a sectional view showing a housing according to the present invention.

FIG. 4 shows a housing 1 according to the present invention, in which a disc part 12 in the center thereof is formed to have its outer circumference of an optional thickness, and a shaft hole 13 perpendicularly perforates through the center of disc part 12.

A cylinder part 14 is protrudingly installed upward around the periphery of shaft hole 13, and an upper jaw 14a is formed to the lower end of the outer periphery of cylinder part 14.

A circular flange part 11 widely extends from outer circumference 12a of disc part 12 to be thinner than disc part 12.

Figure 5:
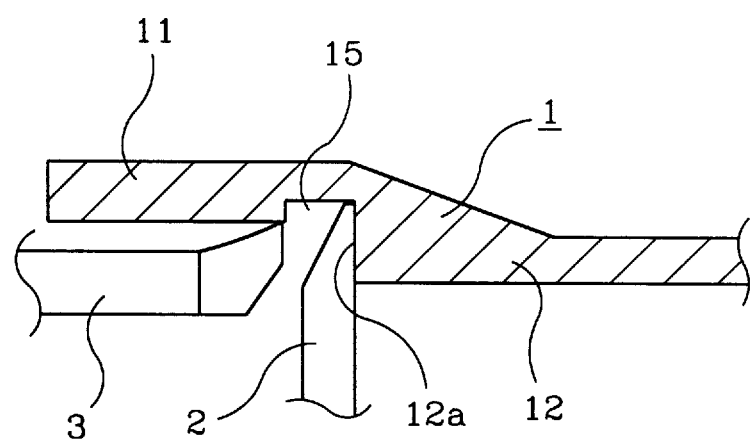
FIG. 5 is a sectional view in enlargement of the major parts of the present invention.

At this time, flange part 11 is characterized in its structure that a shallow annular groove 15 of an optional width is formed along the innermost side of the bottom plane of flange part 11, which will be described in detail with reference to FIG. 5.

In drawings, a reference numeral 2 denotes a chuck, and 3 is a cutter tool.

Housing 1 according to the present invention constructed as above is fabricated in accordance with the sequence as shown in FIG. 6.

To begin with, in the first step, overall configuration is primarily molded via a processing by a die casting in the manner to provide shallow annular groove 15 along the innermost side of the bottom plane of flange part 11 of housing 1 for motor.

Figure 6A:
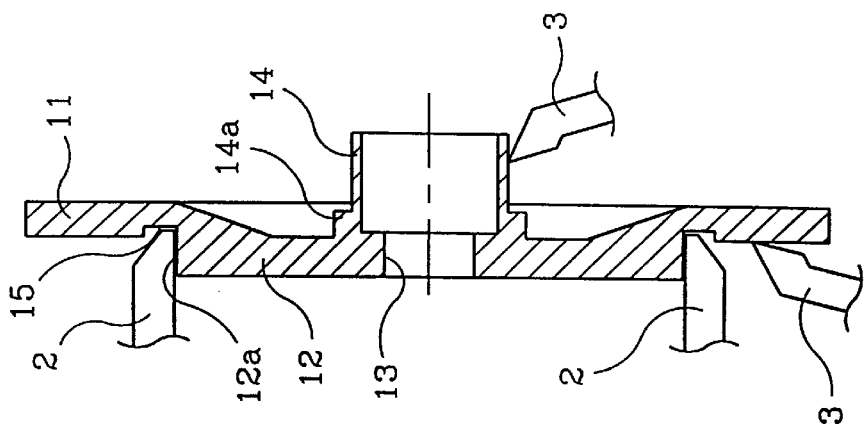
FIGS. 6A to 6D are views for illustrating the sequence of a fabricating process according to the present invention.

In the second step, as shown in FIG. 6A, cylinder part 14 is chucked for enabling the bottom plane of flange part 11, i.e., disc part 12, to be fabricated.

Figure 6B:
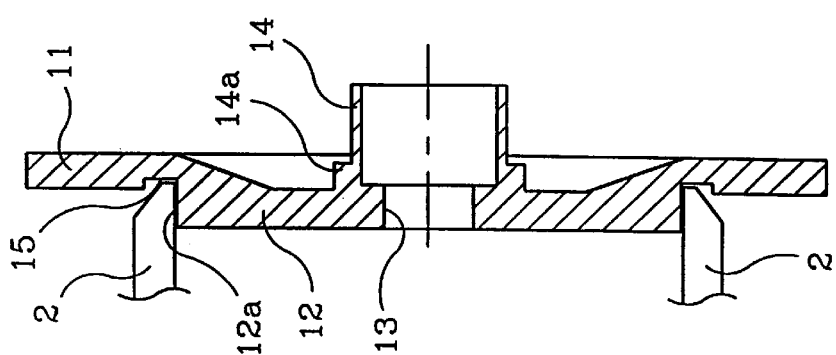

In the third step, as shown in FIG. 6B, the bottom plane of flange part 11 is subjected to the precision processing in advance.

In the fourth step, the outer circumference of disc part 12 is processed to accurately maintain the verticality with the bottom plane of flange part 11. At this time, the outer circumference of disc part 12 is subjected to the processing down to the bottom of annular groove 15 with the same dimensions.

In the fifth step, the chucking of cylinder part 14 is released, and the opposite outer circumference of disc part 12 is then chucked.

Figure 6C:
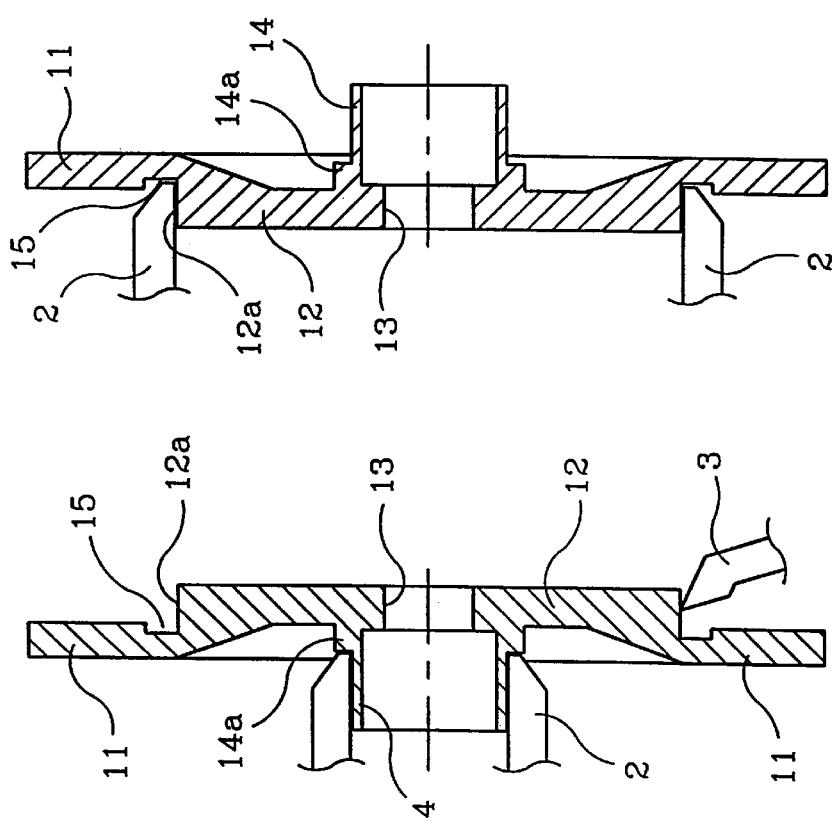

At this time, it is preferable that, as shown in FIG. 6C, the edge end of chuck 2 is chucked to be deeply engaged into the bottom of annular groove 15.

Figure 6D:
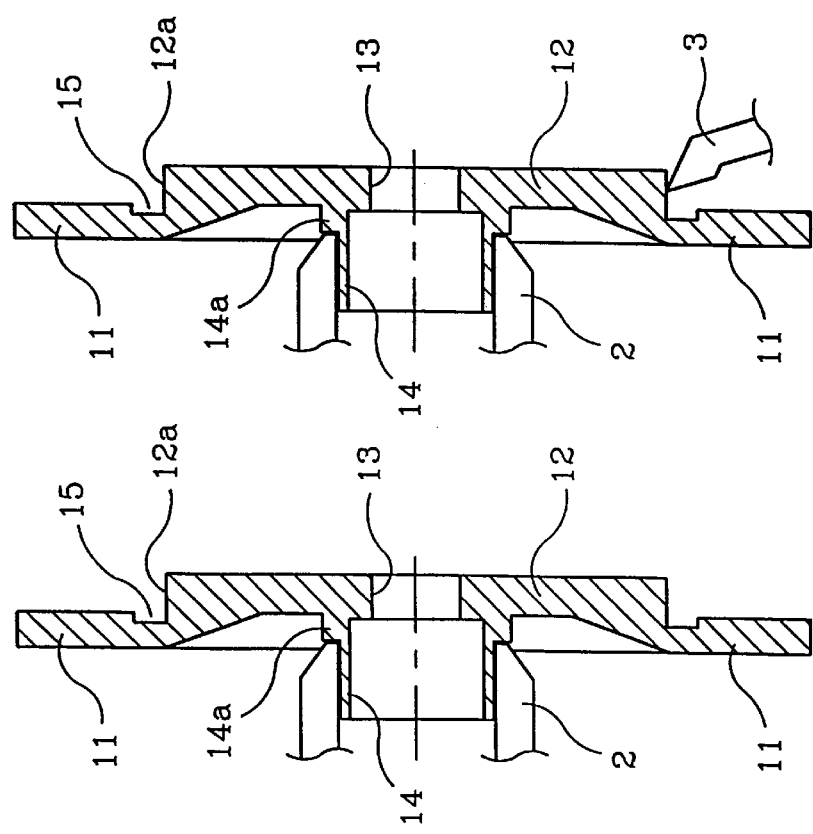

The sixth step precisely processes the inner and outer diameters of cylinder part 14 and the upper plane of flange part 11 as shown in FIG. 6D. Also, shaft hole 13 is precisely processed to maintain the verticality with flange part 11.

By fabricating as stated above, the housing is not repeatedly chucked by several times but is chucked only by twice to reduce the fabricating process. By doing so, the favorable verticality and precise dimensions of respective parts are obtained while quickly performing the fabricating process.

In the housing according to the present invention described in detail as above, the edge end of chuck 2 is more deeply inserted into the corners of flange part 11 and disc part 12 during the initial fabricating, and annular groove 15 is formed to allow cutter tool 3 not to deeply inserted. As the result, the number of chucking processing can be reduced to the minimum to significantly shorten the operating time, and further accurate verticality and processing precision can be provided in its fabrication.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A housing for spindle motor comprising:

a disc part having an outer circumference of an optional thickness;

a shaft hole perpendicularly formed in the center of said disc part;

a cylinder part protrudingly installed upward around the periphery of said shaft hole;

an upper jaw formed to the lower end of the outer periphery of said cylinder part;

a circular flange part extending from the upper portion of said outer circumference of said disc part to be thinner than said disc part; and a shallow annular groove formed along the innermost side of the bottom plane of said flange part to have an optional width, whereby said bottom plane of said flange part is processed at a time during a fabricating process free from a chuck of a cutter tool that chucks said outer circumference of said disc part.

2. A housing for spindle motor as claimed in claim 1, wherein the inner diameter of said annular groove of said flange part coincides with said outer circumference of said disc part.

3. A housing for spindle motor as claimed in claim 1, wherein said annular groove of said flange part has a width greater than a depth, and does not exceed half of the width of said flange part.

* * * * *